United States Patent
Agarwal et al.

(10) Patent No.: US 10,614,101 B2
(45) Date of Patent: Apr. 7, 2020

(54) VIRTUAL AGENT FOR IMPROVING ITEM IDENTIFICATION USING NATURAL LANGUAGE PROCESSING AND MACHINE LEARNING TECHNIQUES

(71) Applicant: Accenture Global Solutions Limited, Dublin (IE)

(72) Inventors: Rajul Agarwal, Bangalore (IN); Trilokesh Satpathy, Bangalore (IN); Unmesh Salgaonkar, Mumbai (IN); Rashmi Virdy, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 189 days.

(21) Appl. No.: 15/824,334

(22) Filed: Nov. 28, 2017

(65) Prior Publication Data
US 2019/0163805 A1 May 30, 2019

(51) Int. Cl.
*G06F 16/28* (2019.01)
*G06F 16/242* (2019.01)
*G06N 20/00* (2019.01)
*G06Q 30/06* (2012.01)

(52) U.S. Cl.
CPC .......... *G06F 16/285* (2019.01); *G06F 16/243* (2019.01); *G06N 20/00* (2019.01); *G06Q 30/0633* (2013.01)

(58) Field of Classification Search
USPC ........................................................ 707/737
See application file for complete search history.

(56) References Cited

U.S. PATENT DOCUMENTS

| | | | |
|---|---|---|---|
| 9,305,311 B2 | 4/2016 | Gharachorloo et al. | |
| 2013/0204882 A1* | 8/2013 | Blaschak | G06Q 30/0203 707/751 |
| 2014/0180790 A1 | 6/2014 | Boal | |
| 2014/0214518 A1 | 7/2014 | Hatch et al. | |
| 2016/0042371 A1* | 2/2016 | Klemm | G06Q 30/0203 705/7.32 |
| 2016/0275590 A1 | 9/2016 | Todasco | |
| 2016/0292204 A1* | 10/2016 | Klemm | G06F 16/3329 |
| 2017/0085515 A1* | 3/2017 | Klemm | H04L 51/32 |
| 2017/0091841 A1 | 3/2017 | Cunico et al. | |
| 2017/0103134 A1* | 4/2017 | Garbowicz | G06Q 50/01 |
| 2018/0089735 A1* | 3/2018 | Lenahan | G06Q 30/0625 |
| 2018/0108025 A1* | 4/2018 | Agarwal | G06Q 30/0201 |
| 2018/0114136 A1* | 4/2018 | Kumar | G06N 7/005 |
| 2019/0026786 A1* | 1/2019 | Khoury | G06Q 30/0271 |
| 2019/0163805 A1* | 5/2019 | Agarwal | G06N 20/00 |

* cited by examiner

*Primary Examiner* — Kim T Nguyen
(74) *Attorney, Agent, or Firm* — Harrity & Harrity, LLP

(57) ABSTRACT

A first device may receive, from a second device, an input corresponding to a search for an item, may identify a set of items, and may determine a set of trend scores associated with the set of items. The first device may determine a set of sentiment scores, and may identify a subset of items, of the set of items, based on the set of trend scores and the set of sentiment scores. The first device may provide, to the second device, information associated with the subset of items to permit the second device to provide, for display, the information associated with the subset of items, and may receive, from the second device, information associated with a selected item, of the subset of items. The first device may determine a return score associated with the selected item, and may perform an action based on the return score.

20 Claims, 10 Drawing Sheets

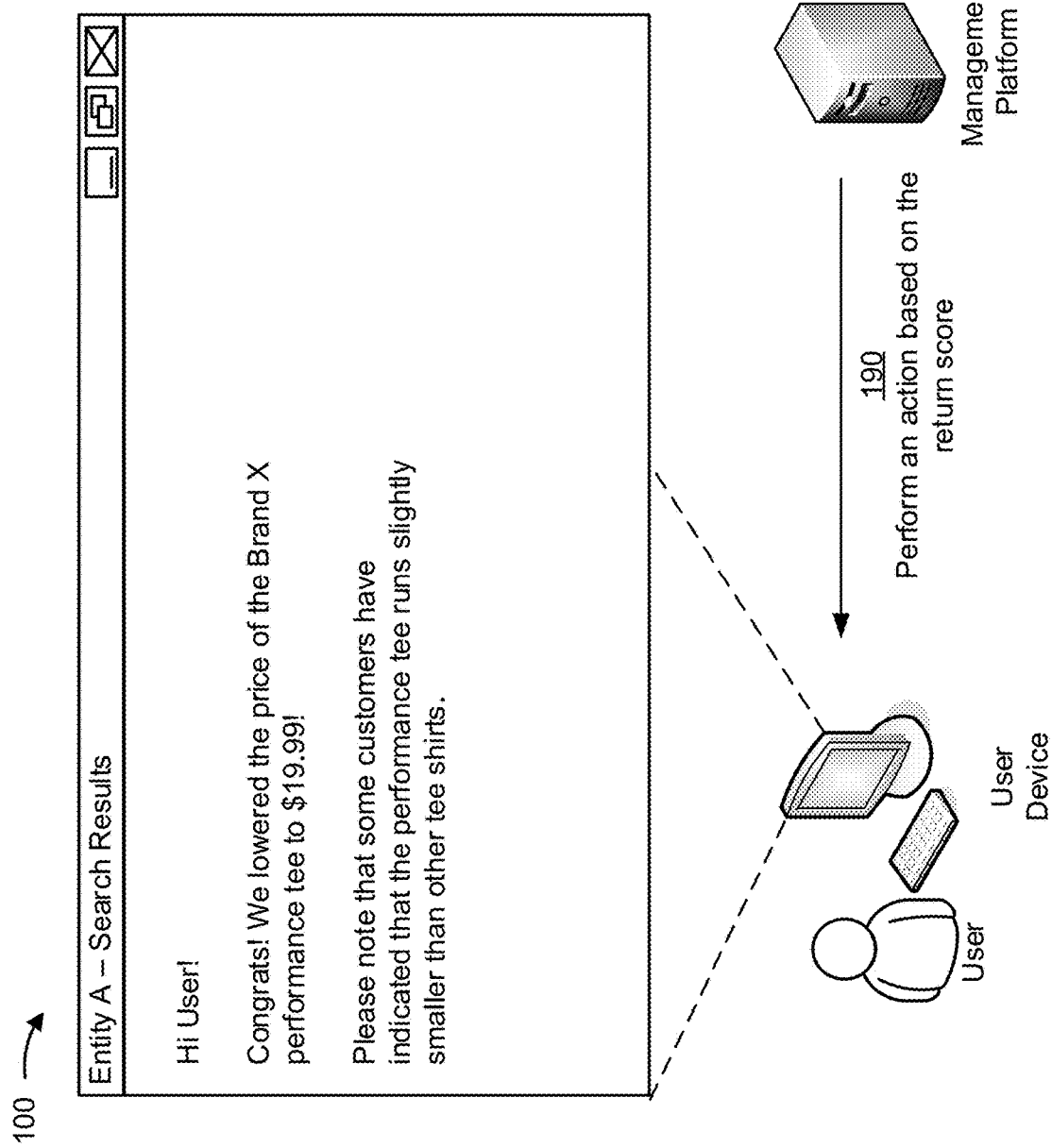

VIRTUAL AGENT FOR IMPROVING ITEM IDENTIFICATION USING NATURAL LANGUAGE PROCESSING AND MACHINE LEARNING TECHNIQUES

BACKGROUND

A user device can include applications (e.g., "virtual agents") that provide assistance to a user of the user device in performing particular actions, such as sending messages, placing calls, providing recommendations, accessing content, and/or the like. A virtual agent can perform the particular actions by interacting with other applications, searching information that is local to the user device (e.g., stored by the user device), and/or by delegating a request to another device (e.g., a web server) that is remote from the user device.

SUMMARY

In some implementations, a first device may include one or more processors to receive, from a second device associated with a virtual agent application, an input corresponding to a search for an item, the second device being associated with a user, and identify a set of items based on receiving the input corresponding to the search for the item. The first device may determine a set of trend scores associated with the set of items based on identifying the set of items, where the set of trend scores are indicative of respective popularities of items, of the set of items, across a time frame, and the set of trend scores are determined based on a first set of data associated with a first data source. The first device may determine a set of sentiment scores associated with the set of items based on identifying the set of items, where the set of sentiment scores are indicative of respective sentiments of the user towards the set of items, and the set of sentiment scores are determined based on a second set of data associated with a second data source that is different than the first data source. The first device may identify a subset of items, of the set of items, based on the set of trend scores and the set of sentiment scores, and may provide, to the second device, information associated with the subset of items to permit the second device to provide, for display, the information associated with the subset of items. The first device may receive, from the second device, information associated with a selected item, of the subset of items, based on providing the information associated with the subset of items, and may determine a return score associated with the selected item based on receiving the information associated with the selected item. The return score is indicative of a probability of the selected item being returned to an entity after being acquired from the entity, and the return score is determined based on a third set of data associated with a third data source that is different than the first data source and the second data source. The first device may perform an action based on the return score.

In some implementations, a method may include receiving, by a first device and from a second device associated with a virtual agent application, an input corresponding to a search for an item, where the second device is associated with a user. The method may include identifying, by the first device, a set of items based on receiving the input corresponding to the search for the item, and determining, by the first device, a set of trend scores associated with the set of items based on identifying the set of items, where the set of trend scores is indicative of respective popularities of items, of the set of items, across a time frame. The method may include determining, by the first device, a set of sentiment scores associated with the set of items based on identifying the set of items, where the set of sentiment scores are indicative of respective sentiments of the user towards the items of the set of items. The method may include identifying, by the first device, a subset of items, of the set of items, based on the set of trend scores and the set of sentiment scores, and providing, by the first device and to the second device, information associated with the subset of items to permit the second device to provide, for display, the information associated with the subset of items. The method may include receiving, by the first device and from the second device, information associated with a selected item, of the subset of items, based on providing the information associated with the subset of items, and determining, by the first device, a return score associated with the selected item based on receiving the information associated with the selected item, where the return score is indicative of a probability of the selected item being returned to an entity after being acquired from the entity. The method may include performing, by the first device, an action based on the return score.

In some implementations, a non-transitory computer-readable medium may store instructions, and the instructions may include one or more instructions that, when executed by one or more processors, cause the one or more processors to receive, from a device associated with a virtual agent application, an input corresponding to a search for an item, where the device is associated with a user, and identify a set of items based on receiving the input corresponding to the search for the item. The one or more instructions may cause the one or more processors to determine a set of trend scores associated with the set of items based on identifying the set of items, where the set of trend scores is indicative of respective popularities of items, of the set of items, across a time frame, and the set of trend scores is determined based on a first set of data associated with a first data source. The one or more instructions may cause the one or more processors to determine a set of sentiment scores associated with the set of items based on identifying the set of items, where the set of sentiment scores is indicative of respective sentiments of the user towards the items of the set of items, and the set of sentiment scores is determined based on a second set of data associated with a second data source that is different than the first data source. The one or more instructions may cause the one or more processors to identify a subset of items, of the set of items, based on the set of trend scores and the set of sentiment scores, and provide, to the device, information associated with the subset of items to permit the device to provide, for display, the information associated with the subset of items. The one or more instructions may cause the one or more processors to receive, from the device, information associated with a selected item, of the subset of items, based on providing the information associated with the subset of items, and determine a return score associated with the selected item based on receiving the information associated with the selected item, where the return score is indicative of a probability of the selected item being returned to an entity after being acquired from the entity, and the return score is determined based on a third set of data associated with a third data source that is different than the first data source and the second data source. The one or more instructions may cause the one or more processors to perform an action based on the return score.

BRIEF DESCRIPTION OF THE DRAWINGS

FIGS. 1A-1G are diagrams of an overview of an example implementation described herein;

DETAILED DESCRIPTION

The following detailed description of example implementations refers to the accompanying drawings. The same reference numbers in different drawings may identify the same or similar elements.

A user, using a user device, can browse items that are available for purchase from an entity. For example, the user can browse products associated with a retailer to identify potential products for purchase. An entity can utilize a virtual agent to assist the user by responding to questions, providing suggestions, and/or the like. In some cases, the virtual agent might suggest items for purchase based on information associated with a purchase history of the user, based on products that have been purchased by other users associated with a demographic to which the user belongs, and/or the like. In such cases, the user might not be interested in the suggested items, might not be inclined to purchase the suggested items, and/or the like. In other words, the virtual agent might inaccurately identify potential items for the user.

Some implementations described herein permit a management platform to identify a set of items based on natural language processing and machine learning techniques and using various scores (e.g., similarity scores, trend scores, and/or sentiment scores, as described elsewhere herein). Some implementations described herein improve the functionality and resource utilization of virtual agents and computer systems implementing the virtual agents by improving accuracy of item identification, reducing resource utilization, reducing a number of user-initiated queries, and/or the like.

Figure 1A:
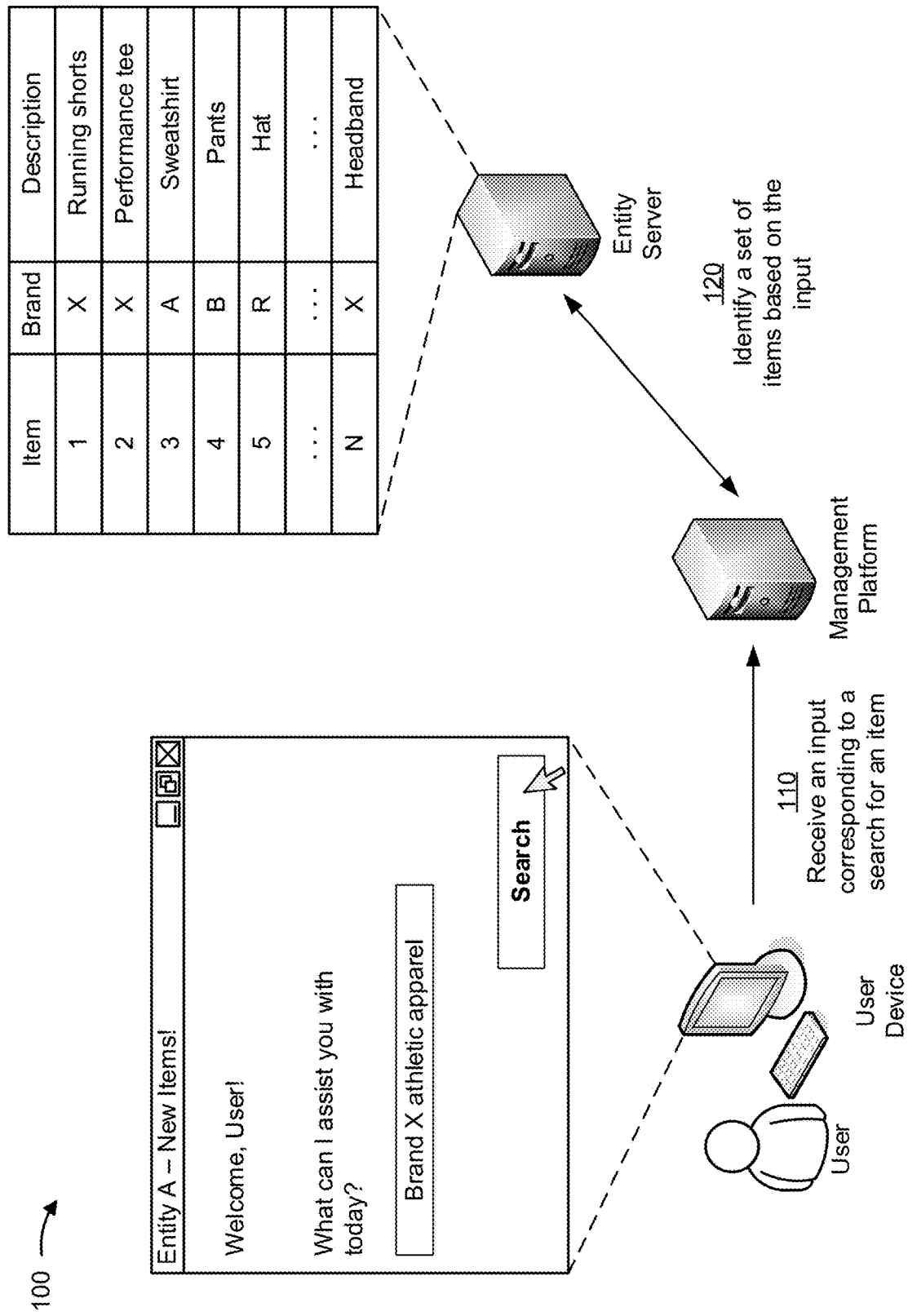

FIGS. 1A-1G are diagrams of an overview of an example implementation 100 described herein. As shown in FIG. 1A, and by reference number 110, a management platform may receive an input corresponding to a search for an item. For example, a user may interact with a user device to cause management platform to perform a search for a particular item. As shown, a virtual agent associated with the user device may prompt the user to perform a search for an item. As shown, the user may input text such as "Brand X athletic apparel."

As further shown in FIG. 1A, and by reference number 120, the management platform may identify a set of items based on the input. For example, the management platform may access an entity server (e.g., a server device that stores information associated with inventory of the entity) and identify a set of items based on accessing the entity server.

In some implementations, the management platform may determine a similarity value (e.g., a hamming distance value, a string matching value, and/or the like) associated with the input text and textual descriptions of a set of items. Additionally, the management platform may identify the set of items based on the similarity values. In other words, the management platform may identify a preliminary set of items that may correspond to the item for which the user is searching.

Figure 1B:
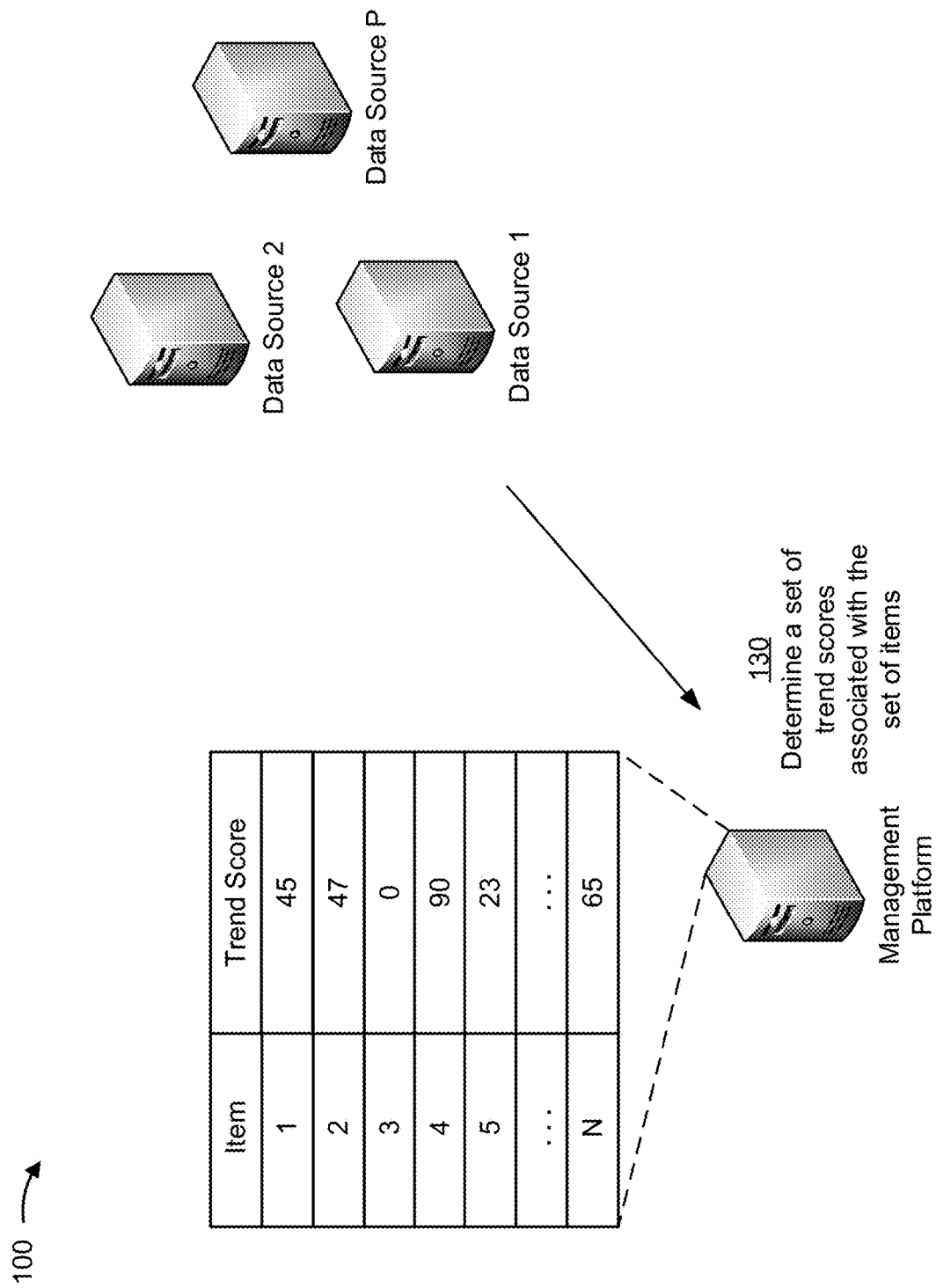

As shown in FIG. 1B, and by reference number 130, the management platform may determine a set of trend scores associated with the set of items. In some implementations, a trend score may be indicative of a popularity of an item across a time frame. As an example, an item having a low trend score may be less popular, may be decreasing in popularity, and/or the like, as compared to an item having a greater trend score. In some implementations, the management platform may receive, from a set of data sources (e.g., data source 1, data source 2, . . . data source P, P>1), information that permits the management platform to determine the set of trend scores. For example, the information may include social media posts, weblog posts, metrics (e.g., positive reviews, negative reviews, upvotes, downvotes, and/or the like), sales figures, and/or the like, associated with the set of items.

Figure 1C:
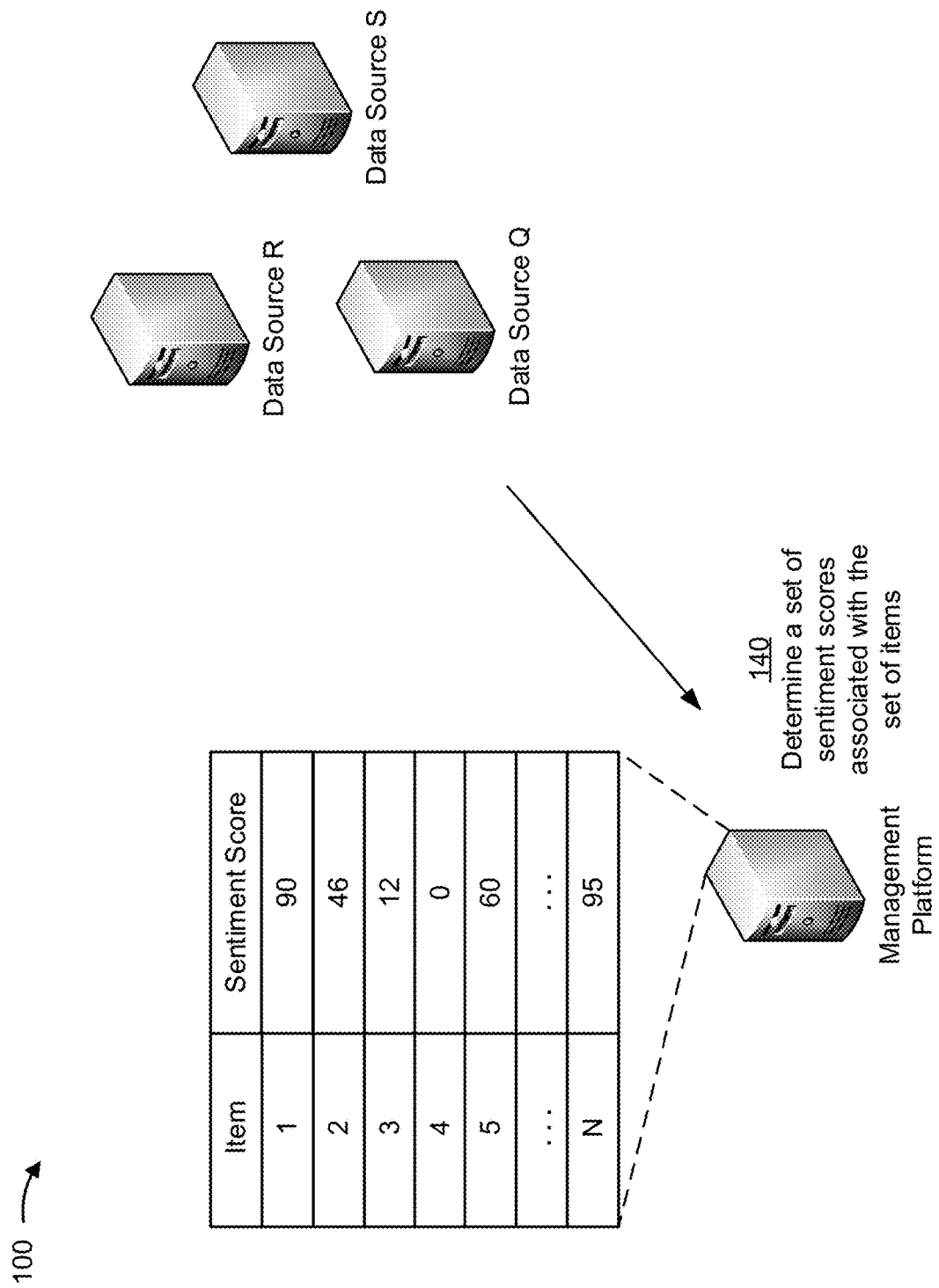

As shown in FIG. 1C, and by reference number 140, the management platform may determine a set of sentiment scores associated with the set of items. In some implementations, a sentiment score may be indicative of a sentiment of the user towards an item. For example, a user may have a more positive opinion towards an item having a greater sentiment score, may be more inclined to purchase an item having a greater sentiment score, and/or the like, than as compared to another item having a lower sentiment score.

In some implementations, the management platform may receive, from a set of data sources (e.g., data source Q, data source R, data source S, and/or the like), information that permits the management platform to determine the set of sentiment scores. For example, the information may include information associated with the user, such as information associated with a profile of the user, demographic information of the user, social media activity of the user, a purchase history of the user, a browsing history of the user, a messaging history associated with the user and the virtual agent, and/or the like.

Figure 1D:
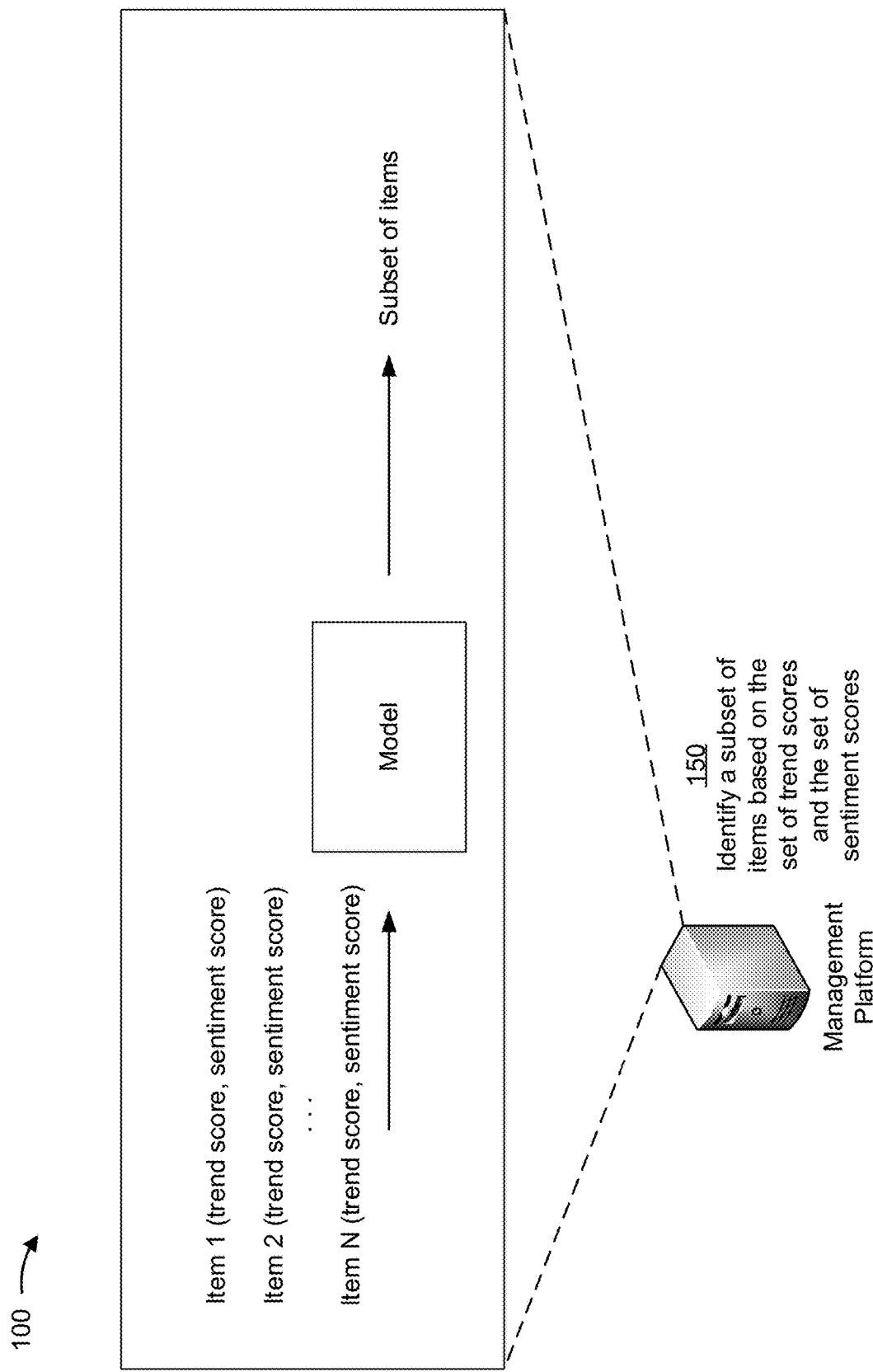

As shown in FIG. 1D, and by reference number 150, the management platform may identify a subset of items based on the set of trend scores and the set of sentiment scores. For example, the management platform may input a set of parameters (e.g., information that identifies an item, information that identifies a trend score associated with an item, information that identifies a sentiment score associated with an item, and/or the like) into a model, and may identify, based on an output of the model, whether information associated with the item is to be provided as a search result associated with the user-initiated search. In other words, the subset of items may correspond to a subset of the items shown in FIG. 1A.

By identifying the subset of items using a machine learning technique and using trend scores and sentiment scores, the management platform improves accuracy of item identification as compared to situations where the management platform uses other information to perform item identification. The subset of items may be of more interest to the user, may be more likely to be purchased by the user, and/or the like. In this way, some implementations described herein improve functionality of computer systems associated with virtual agents by improving item identification using sentiment information and trend information. Put another way, some implementations described herein improve search results associated with user queries.

Figure 1E:
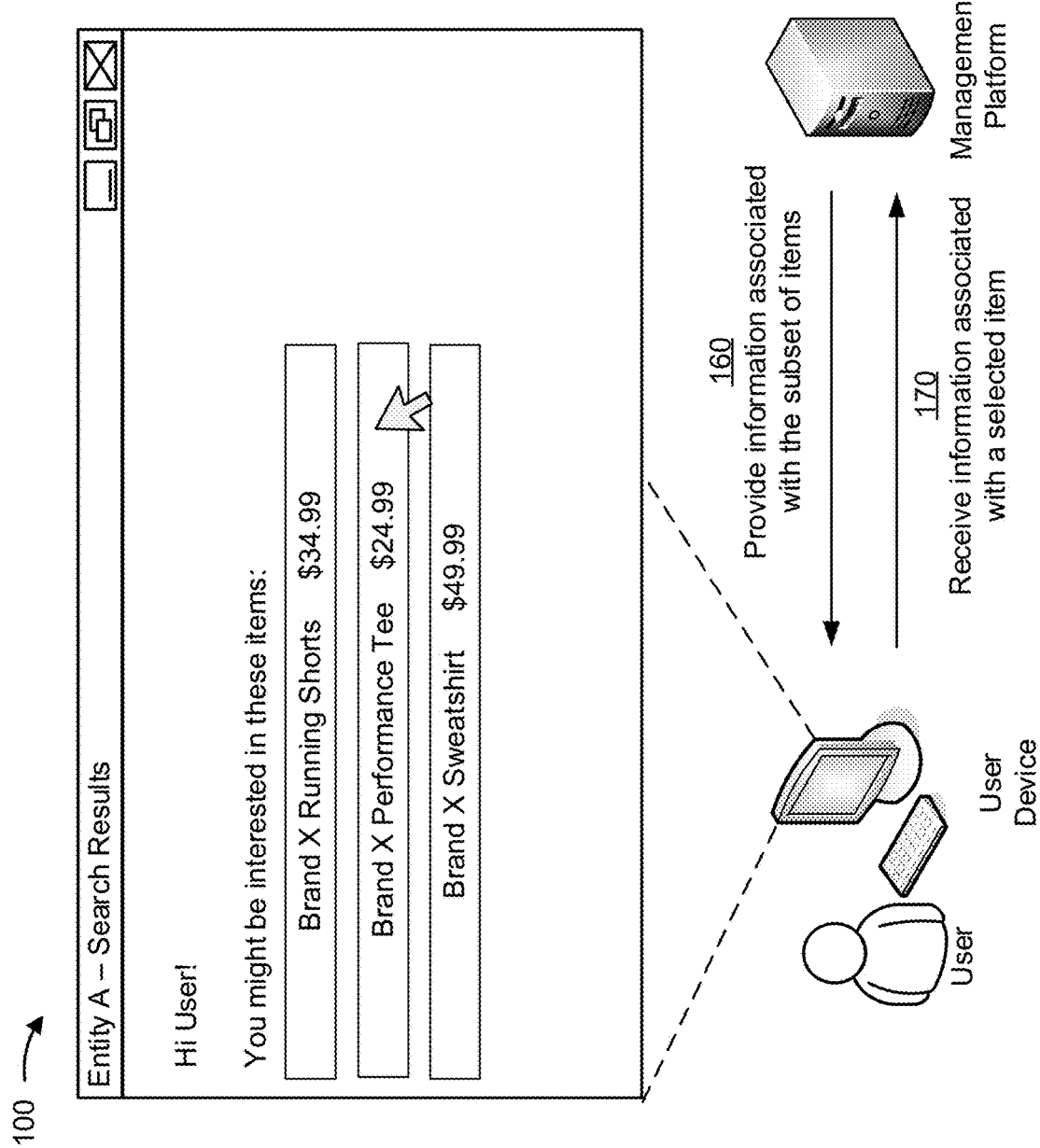

As shown in FIG. 1E, and by reference number 160, the management platform may provide, to the user device, information associated with the subset of items. As shown, the user device may provide, for display, information associated with the subset of items. In other words, the user device may provide information associated with search results.

As further shown in FIG. 1E, and by reference number 170, the management platform may receive, from the user device, information associated with a selected item of the subset of items. For example, as shown, the user may interact with the user device to select a particular item (e.g., Brand X Performance Tee $24.99) to add to a shopping cart, to purchase, to view additional information, and/or the like.

Figure 1F:
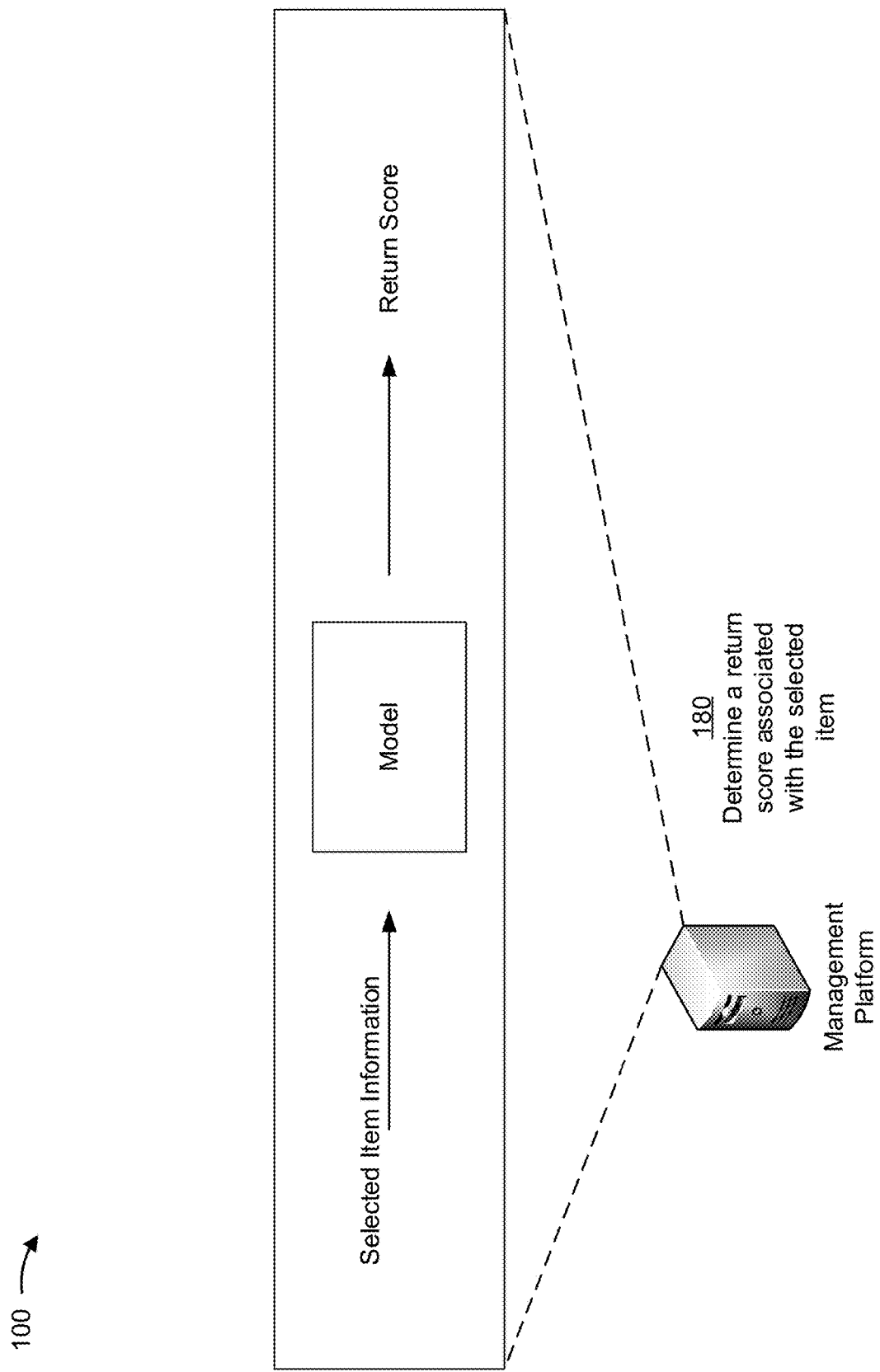

As shown in FIG. 1F, and by reference number 180, the management platform may determine a return score associated with the selected item. In some implementations, a return score may be indicative of a probability of the selected item being returned after being purchased. As an example, an item having a greater return score than as compared to another item may be returned more frequently, may be more prone to being returned, and/or the like.

In some implementations, the management platform may receive, from a data source, information that permits the management platform to determine a return score associated with a selected item. For example, the information may include information associated with a number of sales of the selected item, a number of returns of the selected item, a set of reasons for the returns, an entity's price of the selected item, other entities' prices of the selected item, and/or the like.

In some implementations, the management platform may input information associated with the selected item into a model, and determine a return score associated with the selected item based on an output of the model. In this way, the management platform may determine, based on the return score, a likelihood of the selected item being returned to the entity after a purchase of the selected item by the user.

As shown in FIG. 1G, and by reference number 190, the management platform may perform an action based on the return score. For example, as shown, the management platform may cause a price associated with the selected item to be reduced. As an example, assume that the management platform received information that identifies that another entity is offering the selected item for a lower price than as compared to the entity. In this case, the management platform may reduce the price of the selected item to reduce the probability of the user returning the selected item after purchase.

As further shown in FIG. 1G, the management platform may perform another action, such as by providing information associated with the selected item. For example, as shown, the management platform may provide information that identifies that other users have identified a potential issue with the selected item (e.g., that the selected item might have a sizing issue). As an example, assume that other users returned the selected item and provided reasons for returning the selected item. In this case, the management platform may, using the information identifying the reasons, provide information that notifies the user of the potential issue.

In this way, the management platform may improve the accuracy of item identification by using trend data and sentiment data. By improving the accuracy of item identification, the management platform reduces a number of user queries associated with item identification. Thereby, some implementations described herein conserve resource utilization of computing systems. In addition, the management platform may reduce the number of returned items, thereby conserving resources (e.g., computing systems) relating to shipping the returned item, processing the returned item, restocking the returned item, shipping a replacement item, and/or the like.

As indicated above, FIGS. 1A-1G are provided merely as an example. Other examples are possible and may differ from what was described with regard to FIGS. 1A-1G.

Figure 2:
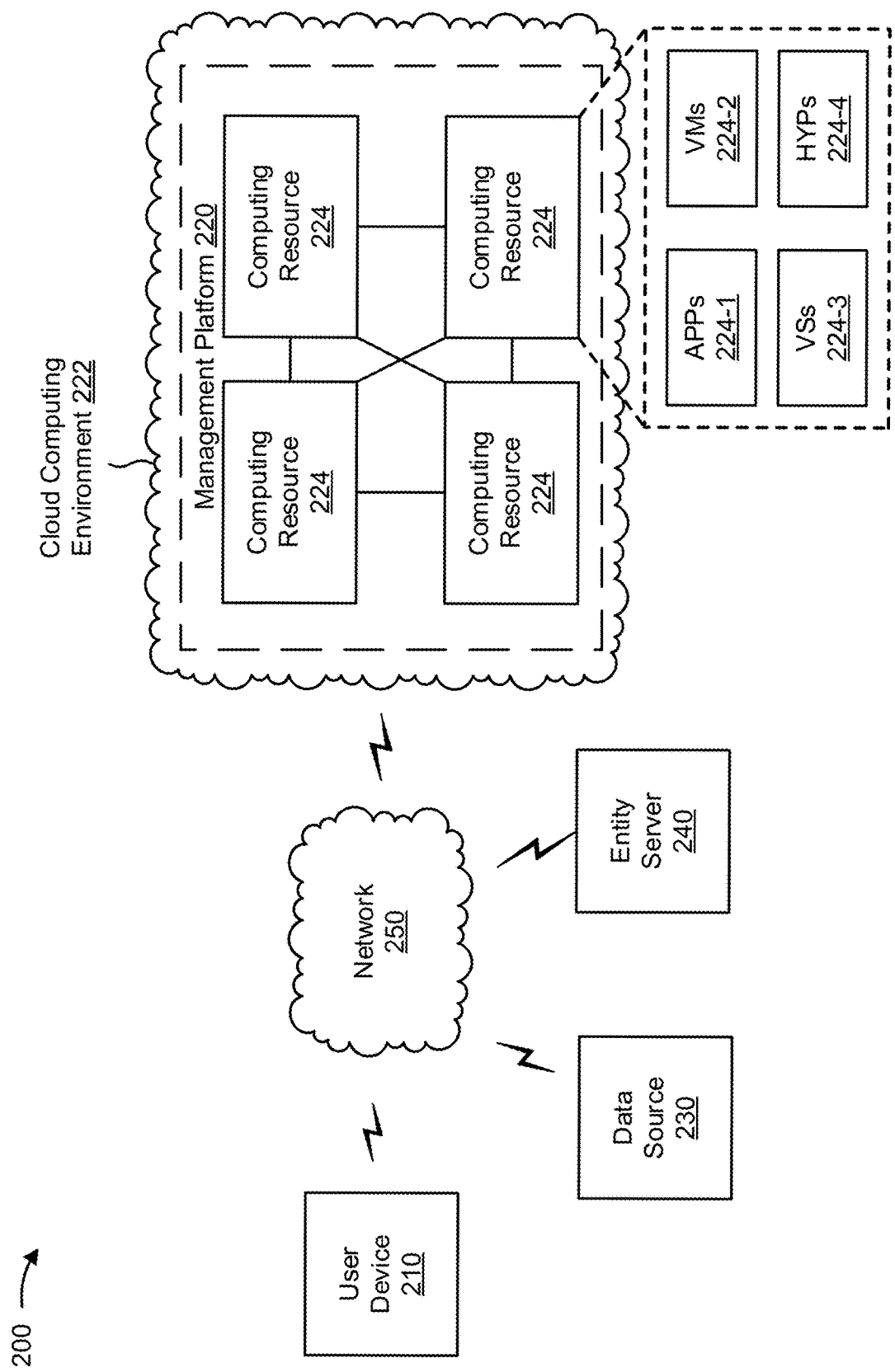
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a management platform 220, a data source 230, an entity server 240, and a network 250. Devices of environment 200 may interconnect via wired connections, wireless connections, or a combination of wired and wireless connections.

User device 210 includes one or more devices capable of receiving, generating, storing, processing, and/or providing information associated with management platform 220. For example, user device 210 may include a computing device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Management platform 220 includes one or more devices capable of receiving information associated with an input corresponding to a search for an item, identifying a set of items based on the input, and providing information associated with a subset of items based on trend scores and sentiment scores associated with the subset of items, as described elsewhere herein. In some implementations, management platform 220 may be designed to be modular such that certain software components can be swapped in or out depending on a particular need. As such, management platform 220 may be easily and/or quickly reconfigured for different uses.

In some implementations, as shown in FIG. 2, management platform 220 may be hosted in a cloud computing environment 222. Notably, while implementations described herein describe management platform 220 as being hosted in cloud computing environment 222, in some implementations, management platform 220 may not be cloud-based (i.e., may be implemented outside of a cloud computing environment) or may be partially cloud-based.

Cloud computing environment 222 includes an environment that hosts management platform 220. Cloud computing environment 222 may provide computation, software, data access, storage, etc. services that do not require end-user (e.g., user device 210) knowledge of a physical location and configuration of system(s) and/or device(s) that hosts management platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host management platform 220. Cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with management platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Data source 230 includes one or more devices, accessible through network 250, that are sources of information that may be used by management platform 220. For example, data source 230 may include a server that includes particular information for use by management platform 220 and/or user device 210. For example, data source 230 may include a server or a group of servers (e.g., a cloud-based server, an application device, a content server, a host server, a web server, a database server, etc.), a desktop computer, or a similar device. In some implementations, various data sources 230 may provide information associated with social media posts, sales figures, weblog posts, articles, search engine analytics metrics, or the like.

Entity server 240 includes one or more devices, accessible through network 250, that are sources of information that may be used by management platform 220. For example, entity server 240 may include a server that includes particular information for use by management platform 220 and/or user device 210. For example, entity server 240 may include a server or a group of servers (e.g., a cloud-based server, an application device, a content server, a host server, a web server, a database server, etc.), a desktop computer, or a similar device. In some implementations, entity server 240 may provide information associated with an entity, such as information associated with a current inventory of items, sales figures, item returns, user profiles, purchase histories, browsing histories, and/or the like.

Network 250 includes one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
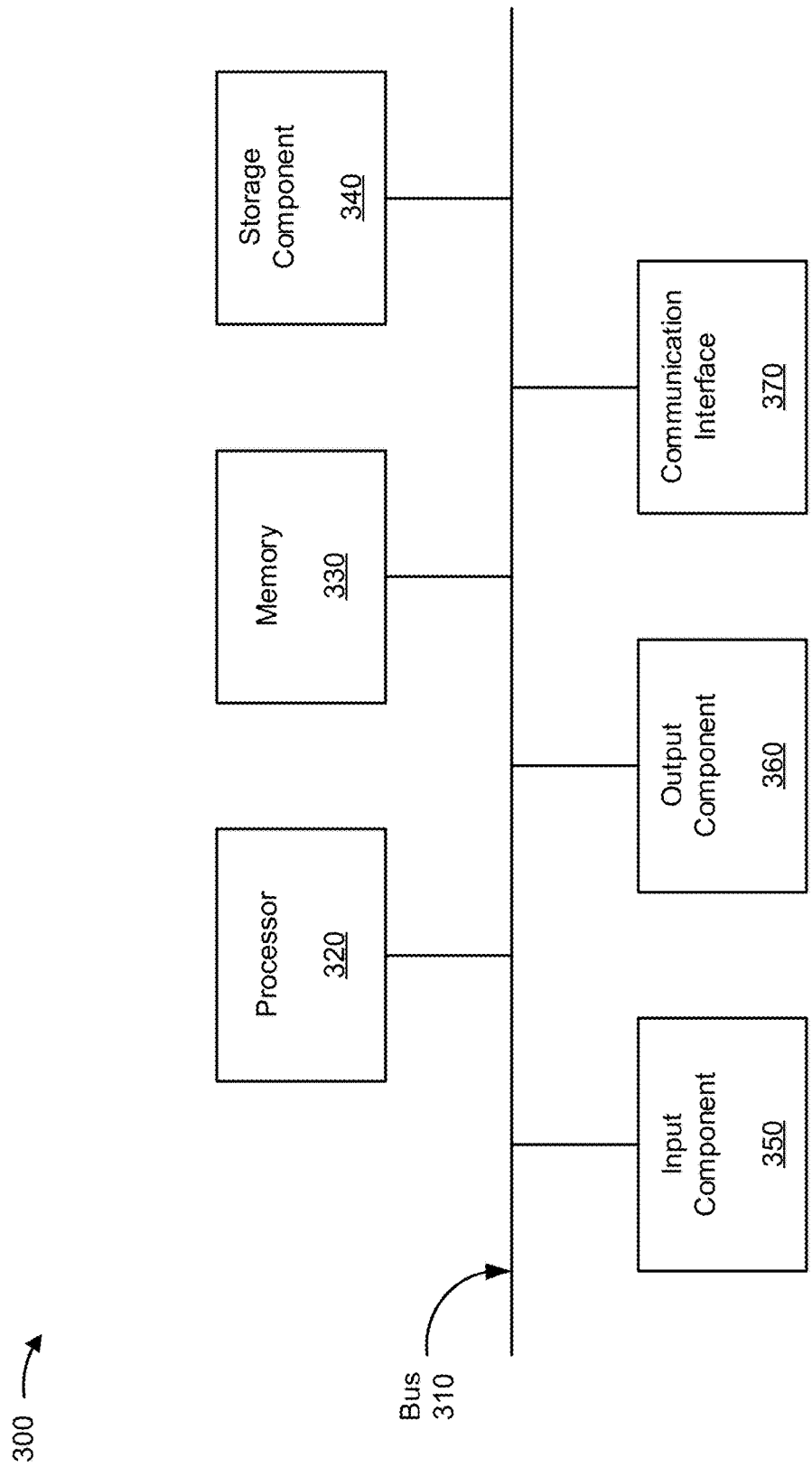
FIG. 3 is a diagram of example components of one or more devices of FIG. 2.

FIG. 3 is a diagram of example components of a device 300. Device 300 may correspond to user device 210, management platform 220, computing resource 224, data source 230, and/or entity server 240. In some implementations, user device 210, management platform 220, computing resource 224, data source 230, and/or entity server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
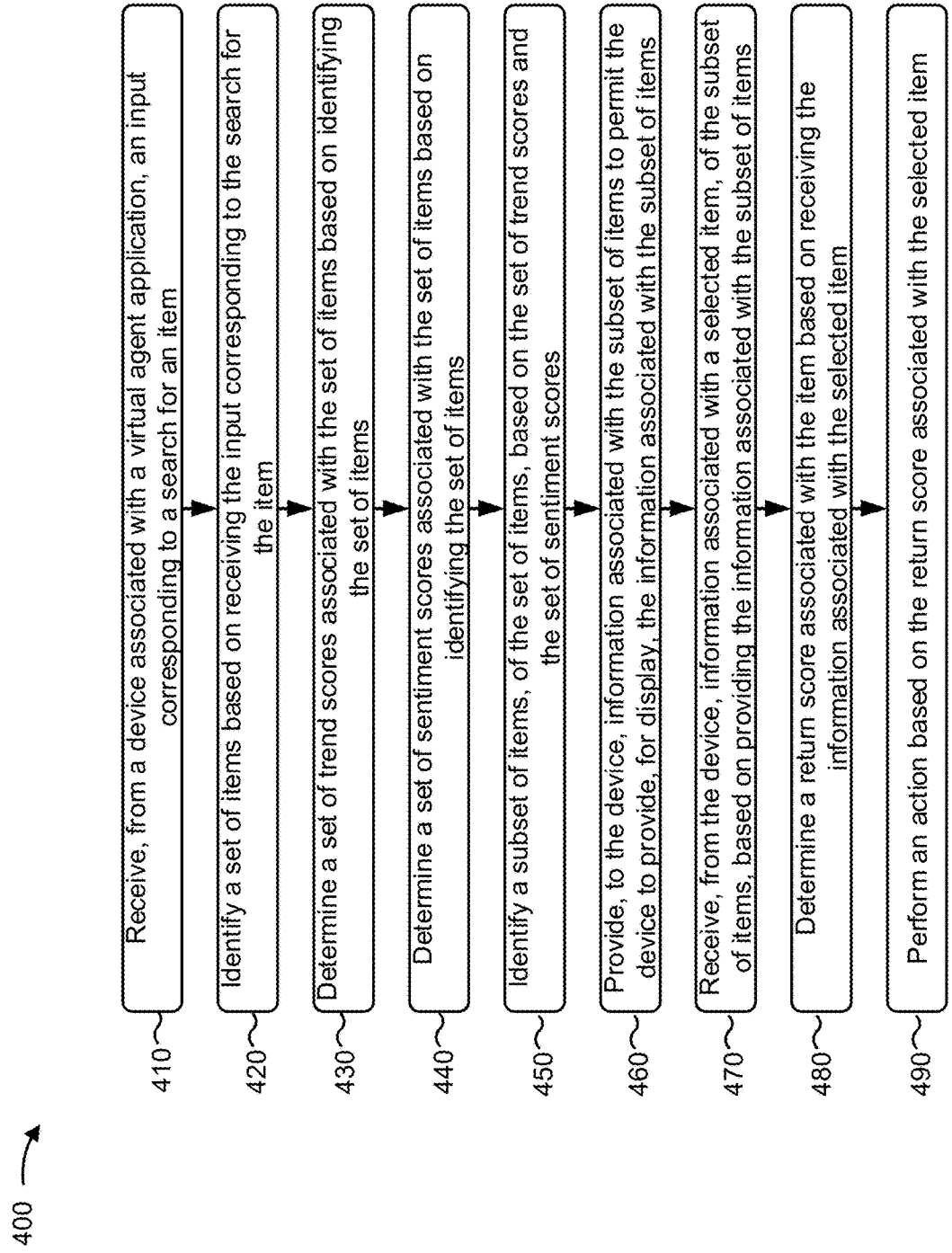
FIG. 4 is a flow chart of an example process for improving item identification using natural language processing and machine learning techniques.

FIG. 4 is a flow chart of an example process 400 for improving item identification using natural language processing and machine learning techniques. In some implementations, one or more process blocks of FIG. 4 may be performed by management platform 220. In some implementations, one or more process blocks of FIG. 4 may be performed by another device or a group of devices separate from or including management platform 220, such as user device 210, data source 230, and/or entity server 240.

As shown in FIG. 4, process 400 may include receiving, from a device associated with a virtual agent application, an input corresponding to a search for an item (block 410). For example, a user, of user device 210, may interact with user device 210 to perform a search for an item, and management platform 220 may receive, from user device 210, information associated with the search for the item.

In some implementations, an entity (e.g., a company, an organization, a group of individuals, and/or the like) may be associated with a set of items (e.g., products, goods, services, and/or the like). For example, a retail entity may sell items such as clothing, footwear, consumer electronics, home goods, and/or the like. While some implementations herein describe particular types of entities and/or particular types of items, it should be understood that implementations described herein are applicable to other types of entities and/or other types of items.

In some implementations, an entity may utilize management platform 220 to permit user devices 210 to access information associated with the entity and/or items associated with the entity (e.g., browse a catalog associated with the entity, browse inventory associated with the entity, and/or the like). In some implementations, user device 210 may access a virtual agent application associated with management platform 220. For example, user device 210 may execute a virtual agent application that permits a user of user device 210 to interact with the virtual agent application to search for items associated with the entity, request information associated with items of the entity, provide questions regarding the entity, and/or the like.

In some implementations, a user of user device 210 may interact with user device 210 to cause user device 210 to provide, to management platform 220, an input corresponding to a search for an item. For example, a user may interact with user device 210 by inputting text corresponding to a search for an item (e.g., "dress shoes," "blue pants," "athletic apparel," "smart phones," and/or the like).

In some implementations, management platform 220 may receive, from user device 210, an input corresponding to a search for an item. For example, management platform 220 may receive information associated with text input associated with user device 210 based on a user interacting with user device 210.

In some implementations, management platform 220 may perform one or more techniques using the input corresponding to the search for the item. For example, management platform 220 may perform a natural language processing technique, such as a segmentation technique, a part-of-speech tagging technique, a parsing technique, a named entity recognition technique, a relationship extraction technique, a term frequency—inverse document frequency technique, a sentiment analysis technique, a word filtering technique, a question answering technique, and/or the like. By performing the one or more techniques using the input corresponding to the search for the item, management platform 220 increases accuracy of item identification, as described elsewhere herein, as compared to situations where management platform 220 does not perform the one or more techniques.

In this way, management platform 220 may identify a set of items based on the input corresponding to the search for the item, as described below.

As further shown in FIG. 4, process 400 may include identifying a set of items based on receiving the input corresponding to the search for the item (block 420). For example, management platform 220 may identify a set of items, associated with the entity, based on receiving, from user device 210, the input corresponding to the search for the item.

In some implementations, management platform 220 may perform a search based on the input corresponding to the search for the item. For example, management platform 220 may access entity server 240, and perform a search for a set of items based on accessing entity server 240. As an example, assume that the input corresponding to the search for the item includes "Brand X athletic apparel." In this case, management platform 220 may perform a search for a set of items that corresponds to the input "Brand X athletic apparel."

In some implementations, management platform 220 may access entity server 240 that stores information associated with the set of items. For example, entity server 240 may store information associated with an item, such as a description of the item, a type of item, a number of available items, a number of sold items, a number of returned items (e.g., returned to the entity after a sale), a popularity of the item, a rating of the item, a review of the item, a category associated with the item, and/or the like.

In some implementations, management platform 220 may identify a set of items based on accessing entity server 240. For example, management platform 220 may perform a search for the set of items using the input received from user device 210 and by accessing entity server 240.

In some implementations, management platform 220 may determine a similarity score associated with the input corresponding to the search for the item and a textual description of an item. For example, management platform 220 may determine a similarity score based on a Levenshtein distance value, a hamming distance value, a Jaro-Winkler distance value, a Sørensen-Dice coefficient value, a tau metric value, a string matching coefficient value, an overlap coefficient value, and/or the like.

In some implementations, a similarity score may be indicative of a similarity between the input corresponding to the search for the item and a particular item. As an example, the particular items of "Brand X running shorts," "Brand X sweatpants," and "Brand X performance tee shirts" may include greater similarity scores associated with the input "Brand X athletic apparel" than as compared to other items such as "Brand Y jeans," "Brand X water bottles," and/or the like.

In some implementations, management platform 220 may identify the set of items based on items including similarity scores that satisfy a threshold (e.g., indicating that the items are similar to the item that the user is searching for). Additionally, or alternatively, management platform 220 may identify the set of items based on items that include the greatest similarity scores (e.g., the top ten items, the top five items, the top item, and/or the like).

In this way, management platform 220 may identify the set of items and may determine trend scores and sentiment scores associated with the set of items, as described elsewhere herein.

As further shown in FIG. 4, process 400 may include determining a set of trend scores associated with the set of items based on identifying the set of items (block 430). For example, management platform 220 may determine a set of trend scores associated with the set of items.

In some implementations, a trend score may be indicative of a popularity of an item and/or indicative of a change in popularity of an item across a time frame. For example, a first item that includes a first trend score that is greater than a second trend score associated with a second item may be more popular than the second item, may be associated with a greater increase in popularity across a time frame than as compared to the second item, and/or the like.

In some implementations, management platform 220 may receive, from a set of data sources 230, information associated with an item, and determine a trend score associated with the item based on the information (e.g., trend information). For example, management platform 220 may receive the information using a set of application programming interfaces (APIs), a web crawling technique, a web scraping technique, a data mining technique, a web searching technique, a database searching technique, and/or the like. In some implementations, management platform 220 may receive the information based on an input from another device, based on a time frame (e.g., periodically), based on an event, and/or the like.

In some implementations, management platform 220 may determine a trend score for an item based on identifying a number of data points that include information associated with the item, based on identifying a number of trend indicators associated with the item (e.g., up votes, down votes, likes, dislikes, comments including terms indicating popularity, comments including terms indicating unpopularity, and/or the like), based on sales data associated with the item (e.g., a number of sales of the item, a number of returns of the item, and/or the like), a number of entities that are offering the item for sale, a number of entities that are manufacturing the item (or similar items), and/or the like.

Some implementations described herein include training and using models. In some implementations, management platform 220 may use machine learning techniques to analyze data (e.g., training data, such as historical data, etc.) and train models. The machine learning techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. In some implementations, management platform 220 may use another kind of computer-implemented technique, such as artificial intelligence, deep learning, machine perception, or computer vision, to analyze data and train models.

In some implementations, management platform 220 may train a model using information associated with a first entity, a first demographic, a first set of items, and/or the like, and use the model in association with a second entity, a second demographic, a second set of items, and/or the like.

In some implementations, management platform 220 may determine a trend score using a model. For example, management platform 220 may input a set of parameters into a model and determine a trend score for an item based on an output of the model. As an example, management platform 220 may input a set of parameters that corresponds to some or all of the trend information described above.

In some implementations, management platform 220 may determine a trend score for an item on a demographic basis. For example, management platform 220 may determine a first trend score for an item using information associated with a first demographic, determine a second trend score for the item using information associated with a second demographic, etc. In other words, an item may be associated with different popularities for different demographics.

In some implementations, management platform 220 may identify a demographic associated with the user of user device 210, and determine a trend score using information associated with the demographic. In this way, management platform 220 increases accuracy of item identification as compared to situations where management platform 220 performs item identification using information associated with other demographics.

In this way, management platform 220 may identify trend scores associated with the set of items, and may use the trend scores when identifying particular items, of the set of items, to provide as results to the input corresponding to the search for the item, as described elsewhere herein.

As further shown in FIG. 4, process 400 may include determining a set of sentiment scores associated with the set of items based on identifying the set of items (block 440). For example, management platform 220 may determine a set of sentiment scores associated with the set of items.

In some implementations, a sentiment score may be indicative of a sentiment of the user towards an item. For example, a sentiment score may be indicative of a sentiment, such as an opinion, a view, an attitude, a feeling, an emotion, a regard, and/or the like, of a user towards an item. As examples, a first sentiment score may be indicative of a positive sentiment towards an item (e.g., indicating that the user might like the item), a second sentiment score may be indicative of a neutral sentiment towards the item (e.g., indicating that the user might be ambivalent towards the item), and/or a third sentiment score may be indicative of a negative sentiment towards the item (e.g., indicating that the user might not like the item).

In some implementations, management platform 220 may receive, from a set of data sources 230, information associated with the user, and determine the set of sentiment scores based on the information associated with the user (e.g., sentiment information). For example, the information associated with the user may include information associated with social media activity of the user, such as social media posts of the user, social media account information, posts that the user has liked, posts that the user has disliked, accounts that the user is following, accounts that the user has interacted with, and/or the like.

In some implementations, the information associated with the user may include a browsing history of the user, a messaging history associated with the virtual agent application, a purchase history of the user, user profile information, and/or the like.

In some implementations, management platform 220 may determine a sentiment score based on a model. For example, management platform 220 may input a set of parameters corresponding to some or all of the sentiment information into a model, and may determine a sentiment score based on an output of the model.

In some implementations, management platform 220 may determine a sentiment score for particular items, of the set of items, that include particular trend scores. For example, management platform 220 may determine sentiment scores for items including trend scores that satisfy a threshold, for items that include the greatest trend scores, and/or the like. In this way, management platform 220 conserves processor and/or memory resources by reducing a number of items for which sentiment scores are determined.

In this way, management platform 220 may determine a set of trend scores and a set of sentiment scores for the set of items, and identify a subset of items based on the set of trend scores and the set of sentiment scores, as described below.

As further shown in FIG. 4, process 400 may include identifying a subset of items, of the set of items, based on the set of trend scores and the set of sentiment scores (block 450). For example, management platform 220 may identify a subset of items based on the set of trend scores and the set of sentiment scores. The subset of items may permit management platform 220 to provide a search result that includes information associated with items that might be of more interest to the user than as compared to other items of the set of items.

In some implementations, management platform 220 may identify the subset of items based on a model. For example, management platform 220 may input a set of parameters associated with an item into a model, and determine whether the item is to be provided as a search result based on an output of the model. As examples, management platform 220 may input a similarity score, a trend score, a sentiment score, and/or the like, of an item into a model, and determine whether the item is to be provided as a search result based on an output of the model.

In other words, management platform 220 may identify particular items that most closely match the item that was searched for by the user, that might be of most interest to the user, that the user might view most favorably, that the user might be more inclined to purchase, and/or the like. In this way, management platform 220 reduces a number of subsequent searches for items (e.g., which conserves processing resources) as compared to situations where management platform 220 does not use similarity scores, trend scores, sentiment scores, and/or the like.

In this way, management platform 220 may identify a subset of items, and provide information associated with the subset of items to permit a user to view search results of the search for the item, as described below.

As further shown in FIG. 4, process 400 may include providing, to the device, information associated with the subset of items to permit the device to provide, for display, the information associated with the subset of items (block 460). For example, management platform 220 may provide, to user device 210, information associated with the subset of items to permit user device 210 to provide, for display, the information associated with the subset of items.

In this way, a user may view the subset of items using user device 210, and may select a particular item to identify additional information associated with the item, purchase the item, and/or the like. In some implementations, the user may select a particular item, which may cause user device 210 to provide, to management platform 220, information associated with a selected item, as described below.

As further shown in FIG. 4, process 400 may include receiving, from the device, information associated with a selected item, of the subset of items, based on providing the information associated with the subset of items (block 470). For example, management platform 220 may receive, from user device 210, information associated with a selected item based on a user selection of the selected item.

In some implementations, user device 210 may provide, to management platform 220, information associated with a selected item based on a user interaction with user device 210. For example, the user may select an item to purchase, may purchase the item, may add the item to a list of items to purchase, and/or the like. In some implementations, the selected item may refer to an item that the user has selected.

In this way, management platform 220 may receive information associated with the selected item, and may determine a return score associated with the selected item, as described below.

As further shown in FIG. 4, process 400 may include determining a return score associated with the selected item based on receiving the information associated with the selected item (block 480). For example, management platform 220 may determine a return score associated with the selected item.

In some implementations, a return score may be indicative of a probability of the selected item being returned to an entity after being acquired from the entity. For example, a selected item that includes a greater return score than another item may be more likely to be returned after being purchased than as compared to the other item.

In some implementations, management platform 220 may receive, from entity server 240, information associated with the selected item. For example, management platform 220 may receive information that identifies a number of sales of the selected item, a number of returns of the selected item, a number of other items purchased with the item, a reason for a return of the item, demographic information associated with users that returned the item, a transaction history associated with the user and the entity, and/or the like.

In some implementations, management platform 220 may determine a return score based on a model. For example, management platform 220 may input a set of parameters (e.g., associated with the above information) associated with an item into a model, and may determine a return score associated with the item based on an output of the model.

In this way, management platform 220 may determine a return score associated with the selected item, and may perform an action based on the return score, as described below.

As further shown in FIG. 4, process 400 may include performing an action based on the return score associated with the selected item (block 490). For example, management platform 220 may automatically perform an action based on the return score associated with the item.

In some implementations, the action may correspond to updating an account. For example, management platform 220 may reduce a price associated with the selected item and update an account associated with the user. As an example, assume that the selected item includes a high return score that is indicative of a high probability of the item being returned, and that the item is available for purchase from other entities for a lower price than as compared to a price offered by the entity. In this case, management platform 220 may reduce a price of the selected item to more closely resemble the price offered by other entities, and/or to reduce the probability of the user returning the selected item.

In some implementations, the action may correspond to providing, to user device 210, information associated with another item. For example, management platform 220 may identify other items that other users have purchased in association with the selected item, and provide information associated with the other items. As an example, management platform 220 may identify other items that, when purchased with the selected item, might reduce the probability of the selected item being returned.

In some implementations, the action may correspond to placing an order for additional items. For example, management platform 220 may cause an order to be placed for additional items. As an example, assume that the selected item includes a low return score that is indicative of a low probability of the item being returned. In this case, management platform 220 may cause an order to be placed for additional items to increase inventory of the selected item.

In some implementations, the action may correspond to sending a notification to another device. For example, management platform 220 may provide a notification, such as a short message service (SMS) message, an email, and/or the like, to another device to inform an operator of the other device of a high return score associated with the selected item, of a low return score associated with the selected item, and/or the like. In some implementations, management platform 220 may provide information associated with user feedback corresponding to a return of the selected item, such as information identifying reasons that users returned the selected item. In this way, an operator associated with the entity may rectify a potential issue associated with the selected item to reduce the probability of future returns of the selected item.

In this way, management platform 220 improves item identification by using trend information and sentiment information when identifying items as search results. By improving item identification, management platform 220 reduces a number of additional requests for item searches, reduces an amount of time associated with a user browsing item inventory, and/or the like. In this way, some implementations described herein improve processor and/or memory resource utilization of user device 210, management platform 220, and/or entity server 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more processors to:
receive, from a second device associated with a virtual agent application, an input corresponding to a search for an item,
the second device being associated with a user;
identify a set of items based on receiving the input corresponding to the search for the item;
determine a set of trend scores associated with the set of items based on identifying the set of items,
the set of trend scores being indicative of respective popularities of items, of the set of items, across a time frame, and
the set of trend scores being determined based on a first set of data associated with a first data source;
determine a set of sentiment scores associated with the set of items based on identifying the set of items,
the set of sentiment scores being indicative of respective sentiments of the user towards the set of items, and
the set of sentiment scores being determined based on a second set of data associated with a second data source that is different than the first data source;
identify a subset of items, of the set of items, based on the set of trend scores and the set of sentiment scores;
provide, to the second device, information associated with the subset of items to permit the second device to provide, for display, the information associated with the subset of items;
receive, from the second device, information associated with a selected item, of the subset of items, based on providing the information associated with the subset of items;
determine a return score associated with the selected item based on receiving the information associated with the selected item,
the return score being indicative of a probability of the selected item being returned to an entity after being acquired from the entity, and
the return score being determined based on a third set of data associated with a third data source that is different than the first data source and the second data source; and
perform an action based on the return score.

2. The first device of claim 1, where the one or more processors are further to:
determine a set of similarity scores associated with the item and the set of items; and
where the one or more processors, when identifying the set of items, are to:
identify the set of items based on the set of similarity scores associated with the item and the set of items.

3. The first device of claim 1, where the one or more processors are further to:
receive information associated with a purchase history of the user; and
where the one or more processors, when determining the set of sentiment scores, are to:
determine the set of sentiment scores based on the information associated with the purchase history of the user.

4. The first device of claim 1, where the one or more processors are further to:
receive information associated with social media activity of the user; and
where the one or more processors, when determining the set of sentiment scores, are to:
determine the set of sentiment scores based on the information associated with the social media activity of the user.

5. The first device of claim 1, where the one or more processors are further to:
receive information that identifies a number of sales of the selected item;
receive information that identifies a number of returns of the selected item; and
where the one or more processors, when determining the return score associated with the selected item, are to:
determine the return score based on the information that identifies the number of sales of the item and the information that identifies the number of returns of the selected item.

6. The first device of claim 1, where the one or more processors are further to:
perform a natural language processing technique using the input corresponding to the search for the item; and
where the one or more processors, when identifying the set of items, are to:
identify the set of items based on performing the natural language processing technique using the input corresponding to the search for the item.

7. The first device of claim 1, where the first set of data is associated with another entity that is different from the entity.

8. A method, comprising:
receiving, by a first device and from a second device associated with a virtual agent application, an input corresponding to a search for an item,
the second device being associated with a user;
identifying, by the first device, a set of items based on receiving the input corresponding to the search for the item;

determining, by the first device, a set of trend scores associated with the set of items based on identifying the set of items,
   the set of trend scores being indicative of respective popularities of items, of the set of items, across a time frame;
determining, by the first device, a set of sentiment scores associated with the set of items based on identifying the set of items,
   the set of sentiment scores being indicative of respective sentiments of the user towards the items of the set of items;
identifying, by the first device, a subset of items, of the set of items, based on the set of trend scores and the set of sentiment scores;
providing, by the first device and to the second device, information associated with the subset of items to permit the second device to provide, for display, the information associated with the subset of items;
receiving, by the first device and from the second device, information associated with a selected item, of the subset of items, based on providing the information associated with the subset of items;
determining, by the first device, a return score associated with the selected item based on receiving the information associated with the selected item,
   the return score being indicative of a probability of the selected item being returned to an entity after being acquired from the entity; and
performing, by the first device, an action based on the return score.

9. The method of claim 8, further comprising:
determining a set of similarity scores associated with a description of the item and a set of other descriptions of the set of items; and
where identifying the set of items comprises:
   identifying the set of items based on the set of similarity scores.

10. The method of claim 8, further comprising:
receiving information associated with a browsing history of the user; and
where determining the set of sentiment scores comprises:
   determining the set of sentiment scores based on the information associated with the browsing history of the user.

11. The method of claim 8, further comprising:
receiving information associated with social media activity of the user; and
where determining the set of sentiment scores comprises:
   determining the set of sentiment scores based on the information associated with the social media activity of the user.

12. The method of claim 8, further comprising:
receiving information associated with a set of values of the selected item; and
where determining the return score comprises:
   determining the return score based on the information associated with the set of values of the selected item.

13. The method of claim 8, further comprising:
receiving information associated with a number of returns of the selected item; and
where determining the return score comprises:
   determining the return score based on the information associated with the number of returns of the selected item.

14. The method of claim 8, further comprising:
receiving information that identifies a number of sales of the set of items; and
where determining the set of trend scores comprises:
   determining the set of trend scores based on the information that identifies the number of sales of the set of items.

15. A non-transitory computer-readable medium storing instructions, the instructions comprising:
one or more instructions that, when executed by one or more processors, cause the one or more processors to:
   receive, from a device associated with a virtual agent application, an input corresponding to a search for an item,
      the device being associated with a user;
   identify a set of items based on receiving the input corresponding to the search for the item;
   determine a set of trend scores associated with the set of items based on identifying the set of items,
      the set of trend scores being indicative of respective popularities of items, of the set of items, across a time frame, and
      the set of trend scores being determined based on a first set of data associated with a first data source;
   determine a set of sentiment scores associated with the set of items based on identifying the set of items,
      the set of sentiment scores being indicative of respective sentiments of the user towards the items of the set of items, and
      the set of sentiment scores being determined based on a second set of data associated with a second data source that is different than the first data source;
   identify a subset of items, of the set of items, based on the set of trend scores and the set of sentiment scores;
   provide, to the device, information associated with the subset of items to permit the device to provide, for display, the information associated with the subset of items;
   receive, from the device, information associated with a selected item, of the subset of items, based on providing the information associated with the subset of items;
   determine a return score associated with the selected item based on receiving the information associated with the selected item,
      the return score being indicative of a probability of the selected item being returned to an entity after being acquired from the entity, and
      the return score being determined based on a third set of data associated with a third data source that is different than the first data source and the second data source; and
   perform an action based on the return score.

16. The non-transitory computer-readable medium of claim 15, where the one or more instructions, when executed by the one or more processors, further cause the one or more processors to:
   receive text associated with the input corresponding to the search for the item;
   determine a set of similarity scores associated with the text and the set of items; and
where the one or more instructions, that cause the one or more processors to identify the set of items, cause the one or more processors to:
   identify the set of items based on the set of similarity scores.

17. The non-transitory computer-readable medium of claim 15, where the one or more instructions, when executed by the one or more processors, further cause the one or more processors to:
   receive information associated with a transaction history between the user and the entity; and
   where the one or more instructions, that cause the one or more processors to determine the return score associated with the selected item, cause the one or more processors to:
      determine the return score based on the information associated with the transaction history between the user and the entity.

18. The non-transitory computer-readable medium of claim 15, where the one or more instructions, when executed by the one or more processors, further cause the one or more processors to:
   receive information associated with social media activity of the user; and
   where the one or more instructions, that cause the one or more processors to determine the set of sentiment scores, cause the one or more processors to:
      determine the set of sentiment scores based on the information associated with the social media activity of the user.

19. The non-transitory computer-readable medium of claim 15, where the action corresponds to adjusting a value associated with the selected item.

20. The non-transitory computer-readable medium of claim 15, where the one or more instructions, when executed by the one or more processors, further cause the one or more processors to:
   receive information associated with a set of other entities, the other entities being different than the entity; and
   where the one or more instructions, that cause the one or more processors to determine the set of trend scores, cause the one or more processors to:
      determine the set of trend scores based on the information associated with the set of other entities.

* * * * *